United States Patent [19]
Varley

[11] 3,952,616
[45] Apr. 27, 1976

[54] ADJUSTABLE GRINDING APPARATUS
[75] Inventor: Bernard Scott Varley, Sabden, near Blackburn, England
[73] Assignee: Automatic Machine & Engineering Co. Limited, England
[22] Filed: Nov. 20, 1974
[21] Appl. No.: 525,706

[30] Foreign Application Priority Data
Nov. 24, 1973 United Kingdom............... 54645/73

[52] U.S. Cl........................................ 76/40; 51/99; 51/216 ND
[51] Int. Cl.² ........................................ B23D 63/14
[58] Field of Search ................ 76/40, 42, 77; 51/99, 51/216 ND, 216 H

[56] References Cited
UNITED STATES PATENTS

| | | | |
|---|---|---|---|
| 2,589,165 | 3/1952 | Toy et al................................. | 76/40 |
| 2,605,654 | 8/1952 | Holmes................................... | 76/77 |
| 2,811,874 | 11/1957 | Rethoret................................ | 51/99 X |
| 2,824,468 | 2/1958 | Nielson ............................. | 76/254 UX |
| 2,828,653 | 4/1958 | Latta...................................... | 76/40 |
| 3,071,026 | 1/1963 | DeWitt .................................. | 76/40 |
| 3,109,327 | 11/1963 | McConnell ............................ | 76/40 |
| 3,279,282 | 10/1966 | Gill......................................... | 76/40 |
| 3,457,809 | 7/1969 | Bowerman.............................. | 76/40 |

Primary Examiner—Al Lawrence Smith
Assistant Examiner—Nicholas P. Godici
Attorney, Agent, or Firm—John C. Smith, Jr.

[57] ABSTRACT

A grinding machine having a base on which is mounted a work piece support and a grinding wheel assembly including a rotatable grinding wheel. The grinding wheel assembly is provided with adjustment mechanisms to enable the grinding wheel to be pivotally adjustable about both horizontal and vertical axes; arcuately movable in a direction which is parallel to or included within a plane containing the plane of rotation of the grinding wheel; and moved along an axis which is parallel to the rotational axis of the grinding wheel. The work piece support is also pivotally adjustable about a vertical axis and is adjustably movable along its vertical axis so that for example the teeth of a circular saw blade forming the work piece and mounted on said support can be ground by the machine.

11 Claims, 8 Drawing Figures

ADJUSTABLE GRINDING APPARATUS

This invention relates to a grinding machine and more particularly but not exclusively to a grinding machine for sharpening wood-working tools.

A conventional grinding machine for sharpening a wood-working tool such as, for example, a circular saw blade usually comprises a power driven grinding wheel which is rotated in a fixed plane and in a fixed position relatively to the machine's base, and a work table which is adapted to hold the saw blade at various angles relatively to the plane of rotation of the grinding wheel. In addition, it is necessary for the work piece table to be capable of moving the saw blade towards and away from the grinding wheel at various angles to the grinding wheel's cutting surface whilst the saw blade is held at a selected one of several angles relative to the plane of rotation. It is therefore necessary, in order to carry out the sharpening of a circular saw blade, to provide a conventional grinding machine with a relatively complex work table arrangement and it has also been found that the sharpening operation on such a machine is a time consuming and therefore expensive operation.

The object of this invention is to provide a relatively simple grinding machine which is capable of more easily and quickly sharpening a wood-working tool, such as a circular saw blade, than the known machine.

According to this invention, a grinding machine comprises a base, a work-piece support, and a grinding wheel assembly having a grinding wheel rotatably mounted thereon, wherein the grinding wheel assembly is mounted on the base so that the plane of rotation of the grinding wheel relatively to the workpiece support is capable of pivotal adjustment about a first and a second axis, and the grinding wheel is pivotable about a third axis for arcuate movement in a direction which is parallel to or included within a plane containing at least part of the cutting surface of the grinding wheel.

Preferably, the first axis is perpendicular or substantially perpendicular to the second axis and the rotational axis of the grinding wheel may be perpendicular or substantially perpendicular to both the first and second axes. A feed mechanism is, preferably, provided for moving the grinding wheel along the third axis which is parallel to the rotational axis of the wheel. The feed mechanism may comprise a screw mechanism for moving the wheel along the third axis against the action of resilient means which is adapted to remove any backlash in the screw mechanism.

The grinding wheel is, preferably, pivotable against the action of spring means between two fixed positions.

Preferably, also, the work-piece support is mounted on the base for pivotal movement about a fourth axis which is parallel to and spaced apart from the first axis, and the support may be axially movable along the fourth axis by adjusting mechanism.

The workpiece support, preferably, comprises an indexing mechanism which is adapted to engage with a tooth of a circular saw blade mounted on the support for rotating the blade about its own axis to move successive teeth of the blade, into a sharpening station adjacent to the cutting surface of the grinding wheel. Preferably, the indexing mechanism includes a saw blade support mechanism which is adapted to frictionally engage with and support the blade adjacent to the peripheral edge thereof.

The grinding wheel assembly may comprise a reversible electric motor drivably connected to the grinding wheel by a belt and pulley mechanism.

A preferred embodiment of this invention will now be described, by way of example only, with reference to the accompanying drawings in which.

Figure 1:
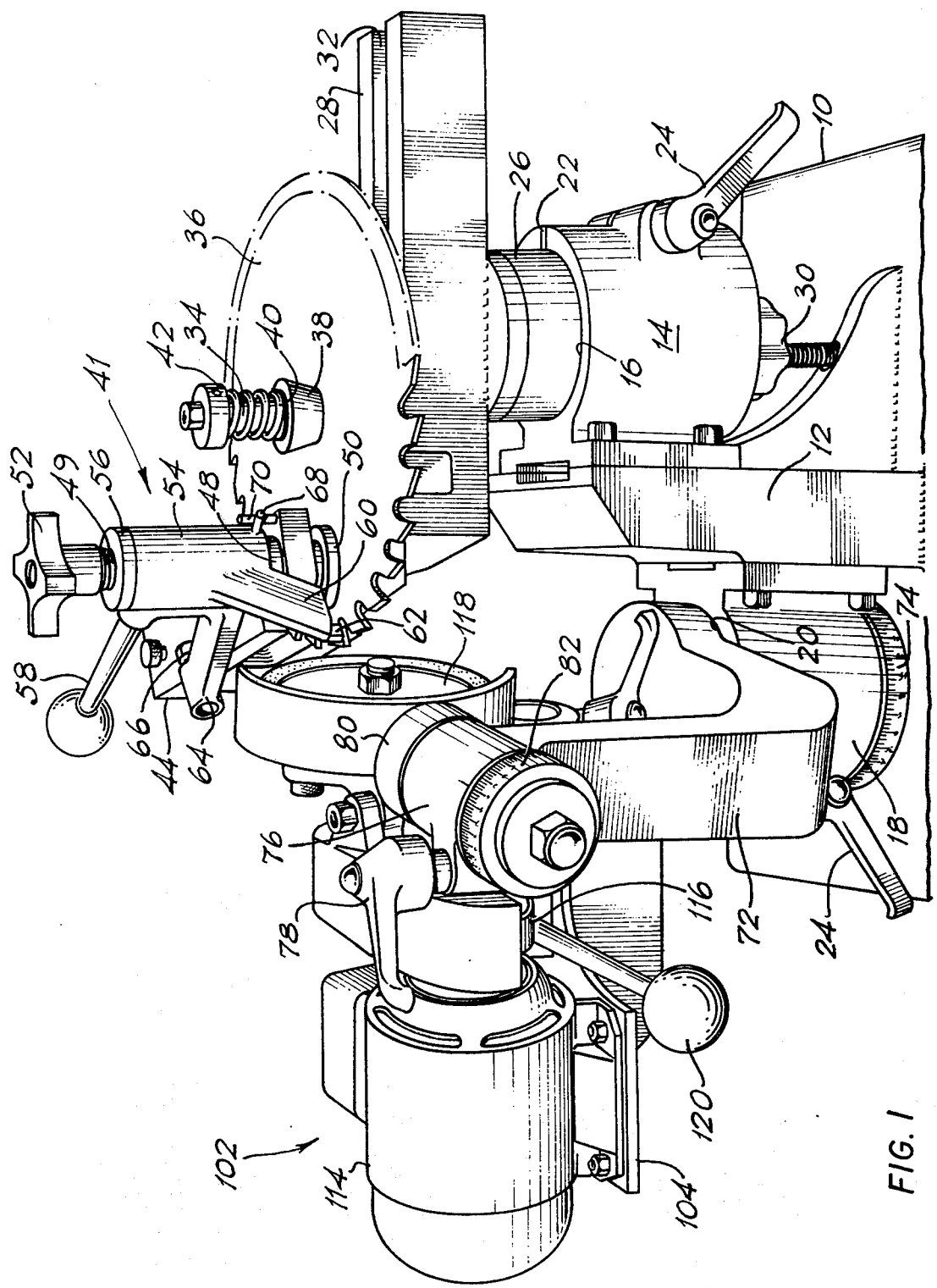
FIG. 1 is a perspective front view of a grinding machine with a circular saw blade mounted thereon.
Figure 2:
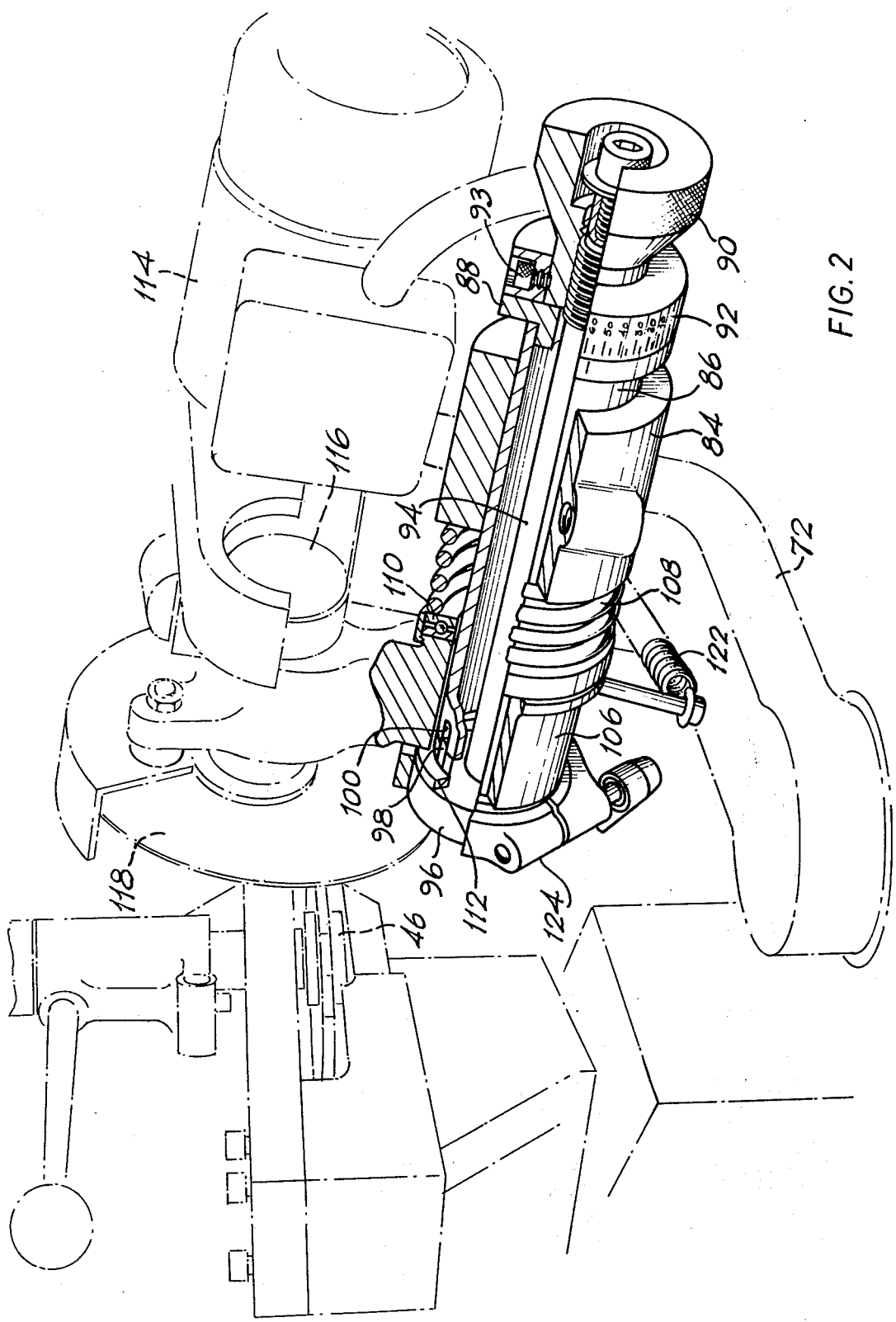
FIG. 2 is a partly sectioned diagrammatic rear view of a grinding wheel assembly of the machine.
Figure 3:
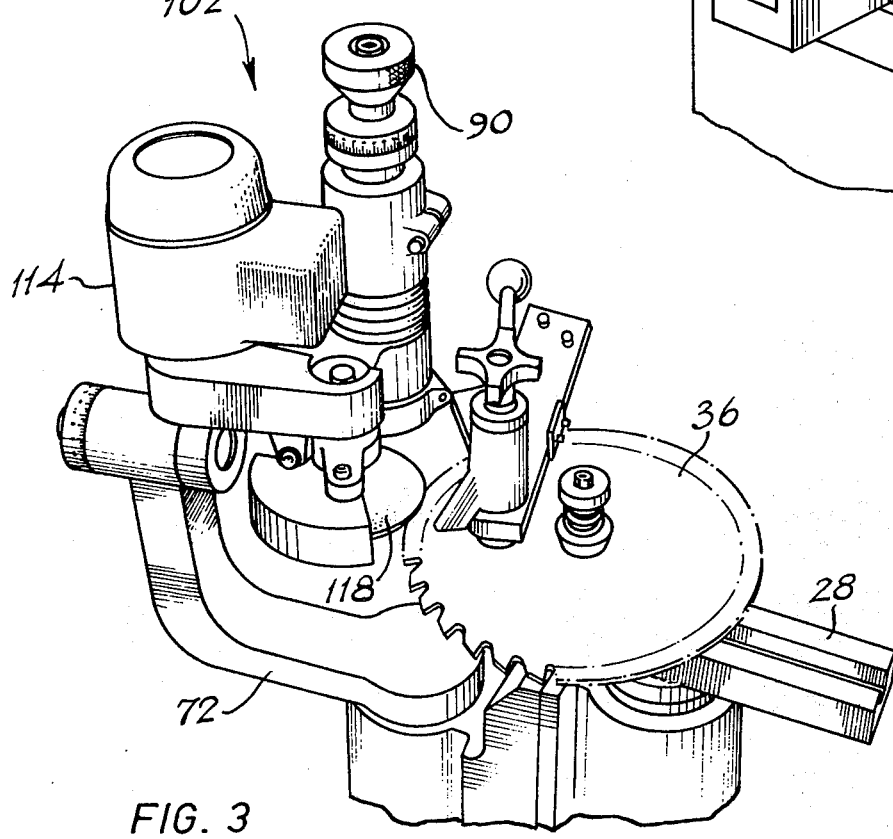
FIG. 3 is a perspective view of the grinding machine shown in FIGS. 1 and 2 with the grinding wheel in a horizontal plane.

Referring now to FIGS. 1 to 3 of the drawings, a grinding machine for sharpening the cutter edges of a wood-working tool comprises a rectangular base 10 having an upright central pillar 12 formed thereon. A work-piece mounting boss 14 having a vertical bore 16 formed therein is bolted to one side face of the pillar 12 and a similar grinding wheel mounting boss 18, having a vertical bore 20 is bolted to the opposite side face of the pillar 12. Each boss 14, 18 has a longitudinally extending slit 22 formed therein and is provided with a conventional pinch type clamping assembly 24 for varying the effective diameter of the associated bore 16, 20 to rigidly clamp a member therein or release it for movement relatively to the associated boss 14, 18.

A cylinder 26, which is mounted in the bore 16 of the boss 14, is secured at its upper end to the lower surface of a work-piece table 28. The plane of the table 28 is at right angles to the longitudinal axis of the cylinder 26 and when the clamping assembly 24 on the boss 14 is released the table 28 is capable of pivotal movement in a horizontal plane relatively to the base 10. In addition, a screw adjustment mechanism 30 is provided on the base 10, which mechanism engages with the lower end of the cylinder 26 to move the cylinder 26 longitudinally within the boss 14 thus raising or lowering the table 28 relatively to the base 10. The table 28 has a longitudinally extending slot 32 of conventional inverted T-shape in cross section formed therein. A conventional T-shaped block (not shown) is mounted in the slot 32 and a screw-threaded rod 34 secured to the block extends upwardly from the table 28 through a central hole in a circular saw blade 36 which is positioned on the table 28.

The circular saw blade 36 is secured to the table 28 by means of a conical member 38 mounted on the screw-threaded rod 34 which is urged downwardly to engage in the central hole in the blade 36 by the action of a helical compression spring 40. The spring 40 is mounted on the screw-threaded rod 34 and confined endwise between the upper surface of the conical member 38 and the lower surface of a knurled nut 42 which is screwed on to the upper end of the rod 34.

A work-piece clamping and indexing device 41 is provided on a U-shaped support member 44 formed on the table 28 and extending substantially at right angles to the length of the slot 32 and the saw blade 36 is positioned on the table 28 so that the peripheral edge thereof extends between the arms of the U-shaped member 44 with the teeth of the blade 36 projecting a short distance beyond the front edge of the member 44. The lower arm of the U-shaped member 44 is provided adjacent to the open end of the U with a friction pad 46 on which part of the peripheral edge portion of the blade 36 rests.

The upper arm of the U-shaped member 44 has an upwardly extending internally screw-threaded collar 48 secured thereto into which is screwed a vertically extending shaft 49. The lower end of the shaft 49 extends into the space between the two arms of the U-shaped member 44 and has a pad 50 secured thereto which is located directly above the pad 46. The upper end of the shaft 49 has a knob 52 pinned thereto to enable the shaft 49 to be screwed downwardly relatively to the upper arm of the member 44 so that the blade 36 can be nipped between the pad 46 and the pad 50.

The collar 48 has a plane external surface on which is pivotally and axially slidably mounted a cylindrical member 54. The member 54 is urged upwardly into contact with an annular sleeve 56 secured to the upper end of the collar 48 as shown in FIG. 1 by a spring-loaded pin (not shown) mounted in a bore in the member 54 and adapted to contact the upper surface of the top arm of the U-shaped member 44. The member 54 is provided with a radially extending handle 58 and a downwardly sloping projection 60 having a peg 62 secured to its lower face. When the handle 58 is depressed the member 54 is urged downwardly against the action of the spring loaded pin (not shown) to engage the peg 62 between two adjacent teeth of the circular saw blade 36. Rotation of the handle 58 and the member 54 about the collar 48 with the peg 62 in this engaged position causes the blade 36 to be rotated about the axis of the conical member 38, the peripheral edge portion of the blade 36 sliding between the pads 46 and 50 one or both of which are provided with a surface formed of a friction material. At the conclusion of a forward indexing movement pressure on the handle 58 is released and the member 54 rises under its spring loading to disengage the peg 62 from the teeth of the blade 36. The handle 58 can then be used to return the member 54 to its original position ready to be depressed into the space between two other teeth for the next indexing operation. The arcuate distance which the blade 36 is indexed, (i.e. for example one or two tooth pitches), is controlled by means of an adjustable stop mounted on the member 54. The stop comprises a radially extending arm 64 having an adjusting screw 66 at its outer end which is adapted to contact an upwardly projecting plate (not shown) secured to the upper surface of the top arm of the U-shaped member 44 when the member 54 is rotated in a clockwise direction as seen in plan, and a pin 68 extending radially from the member 54 which is adapted to contact an upwardly projecting pin 70 on the U-shaped member 44 when the member 54 is rotated in an anti-clockwise direction, to the limiting position shown in FIG. 1 of the drawings.

When the saw blade 36 is placed on the table 28, the blade is positioned manually, so that one of its teeth is in a sharpening station. The clamping device nips the blade 36 between the friction pads 46 and 50, and although this nip is adequate to prevent "chattering" of the blade 36 when a tooth at the sharpening station is being ground, it does not prevent rotation of the blade to index the teeth.

An L-shaped grinding wheel bracket 72, having a cylindrical stub shaft (not shown) at one end which is mounted in the bore 20 of the boss 18, is pivotable relatively to the base 10 about a vertical axis when the clamping assembly 24 associated with the boss 18 is released. An annular ring 74 having a graduated scale marked thereon is pinned to the lower end of the stub shaft which projects below the boss 18 to enable the L-shaped bracket 72 to be angularly positioned about the vertical axis relatively to the base 10 and thus relatively to the work-piece table 28 at a required position.

The upper end of the L-shaped bracket 72 has a horizontally extending cylindrical portion 76 formed thereon, which is provided with a longitudinally extending slit (not shown) and a pinch type clamping assembly 78 for increasing or reducing the effective diameter of the bore of the cylindrical portion 76. A wheel carrier 80 is provided with a stub shaft (not shown) at one end which is mounted in the bore of the cylindrical portion 76 so that when the clamping assembly 78 is released the carrier 80 is pivotable about the horizontal longitudinal axis of the cylindrical portion 76 relatively to the work-piece table 28. An annular ring 82 is secured to the end of the stub shaft of the carrier 80 which projects from the bore of the cylindrical portion 76 and the ring 82 has a graduated scale formed thereon to enable the carrier 80 to be angularly positioned relatively to the work-piece table 28 at a required position. The other end of the carrier 80 has a cylindrical portion 84 (see FIG. 2) within which is rigidly clamped a tube 86 extending at right angles to the horizontal axis about which the carrier 80 is pivotable.

A feed screw 94 extends longitudinally through the tube 86 and is rigidly secured at one end to an enlarged diameter cup 96. The cup 97 has a key 98 fastened thereon which is slidably mounted in a slot 100 formed in the end of the tube 86 to prevent rotation, but allow limited axial movement of the cup 96 relatively to the tube 86. A grinding wheel assembly indicated generally at 102 comprises a base plate 104 having a cylindrical boss 106 which is slidably mounted on the tube 86. A helical compression spring 108 surrounds part of the tube 86 and is confined endwise between the cylindrical portion 84 of the carrier 80 and a thrust bearing 110 mounted on one end of the boss 106. The spring 108 urges the boss 106 towards the cup 96 and into contact with an annular bearing plate 112 located between the boss 106 and the cup 96. Thus the spring 108 urges the grinding wheel assembly 102 and the cup 96 towards the work-piece table as seen in FIG. 2. The opposite end of the feed screw 94 to that which carries the cup 96 is externally screw-threaded and engages in the screw-threaded bore of an adjusting knob 90. The latter carries a graduated scale ring 92 (which is connected to the knob by a locking screw 93) and bears on a flanged end cover 88 fitted into the tube 86.

By virtue of the spring loading of the assembly 102, the knob 90 is always pressed into engagement with the cover 88 and the spring loading thereby takes up any backlash in the screw threads of the shaft 94 and the knob 90. If the knob is rotated the shaft 94 — and with it the grinding wheel assembly 102 — is moved in one direction against the spring loading or in the other direction by the spring loading. This arrangement therefore provides for axial adjustment of the grinding wheel in a direction parallel to the length of the work-piece table 28.

The grinding wheel assembly 102 comprises a reversible electric motor 114 mounted on the base plate 104 the motor being drivably connected by a belt-and-pulley drive 116 to a diamond abrasive grinding wheel 118 which is rotatably mounted in a conventional bearing arrangement mounted on the plate 104. The plate 104 has a handle 120 secured thereto to enable the assembly 102 to be pivoted in an arcuate path about the longitudinal axis of the tube 86 to feed the wheel arcuately in a plane tangential to the blade 36. This pivotal movement of the assembly 102 is permitted by the pivotal movement of the boss 106 on the tube 86 and is facilitated by the boss 106 being mounted between the bearing plate 112 and the thrust bearing 110. In addition, a helical tension spring 122 is connected between the boss 106 and the carrier 80 to counterbalance the weight of the plate 104 and the components mounted thereon to facilitate pivotal movement of the assembly 102 about the tube 86. An adjustable stop 124 is releasably clamped to the cup 96 and is adapted to engage with a projection (not shown) on the plate 104 to limit the pivotal movement of the grinding wheel assembly 102.

When it is desired to sharpen the teeth of the circular saw blade 36, the height of the work-piece table 28 is initially adjusted as hereinbefore described to bring the teeth to the operative position, shown in FIG. 1 of the drawings so that the plane of the saw blade 36 is level with the pivotal axis of the carrier 80. Similarly, the position of the wheel 118 is selected by (a) pivotal movement of the L-shaped bracket 72 about the vertical axis relative to the base 10, (b) pivotal movement of the carrier 80 about the horizontal axis relatively to the bracket 72 and (c) axial feed of the assembly 102 along the axis of the tube 86. These adjustments are carried out so that when the assembly 102 is pivoted about the axis of the tube 86 by movement of the handle 120 the grinding wheel 118 which is being rotated about its own axis by the motor 114 has the correct amount of feed applied to it to sharpen the peripheral edge of the tooth of the blade 36 which is at the sharpening station. The blade 36 is then indexed by operation of the device 41 to bring the next tooth to be sharpened into the sharpening station and the assembly 102 is then pivoted again about the axis of the tube 86 to sharpen this tooth.

Referring now to FIG. 3 of the drawings, when it is desired to sharpen or dress the side faces of the teeth on the blade 36, the assembly 102 is adjusted to the position shown in this figure wherein the grinding wheel 118 is positioned parallel to the side face of the tooth at the sharpening station. This is achieved by turning the carrier 80 about its axis. As adjacent teeth on a conventional saw blade are angularly offset it will be necessary to set the position of the wheel 118 for one tooth and then to adjust the indexing device 41 to bring alternate teeth of the blade 36 into the sharpening station. The remaining series of alternate teeth will be sharpened after a readjustment of the position of the grinding wheel assembly 102.

Figure 4:
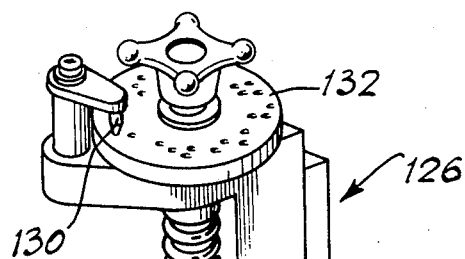
FIG. 4 is a perspective view of the grinding machine with a small diameter circular saw blade mounted thereon.

FIG. 4 of the drawings, illustrates the positioning of the grinding wheel assembly 102 for sharpening the front edge of the teeth of a circular saw blade. The faces of the wheel 118 are in vertical planes, but the bracket 72 is turned about the axis of the boss 18 to bring the sides of the wheel 118 parallel with the length of the table 28. In addition, the work-piece table 28 has a fixture 126 mounted thereon to enable a small diameter circular saw blade 128 to be accommodated. The indexing mechanism on this fixture 126 comprises a pin 130 which is selectively insertable into one of a plurality of holes in a circular plate 132 mounted on the end of a shaft 134 to which the blade 128 is secured. The positioning of the assembly 102 would of course be identical for sharpening the front edge of the teeth of the blade 36 to that which is shown in FIGS. 1 to 3 of the drawings. It is also usual to offset the angles of the front edges of alternate teeth of a saw blade and it will be necessary to sharpen alternate teeth of the blade with the wheel 118 set to one angle and then to reposition the wheel 118 and sharpen the remaining series of alternate teeth.

Figure 5:
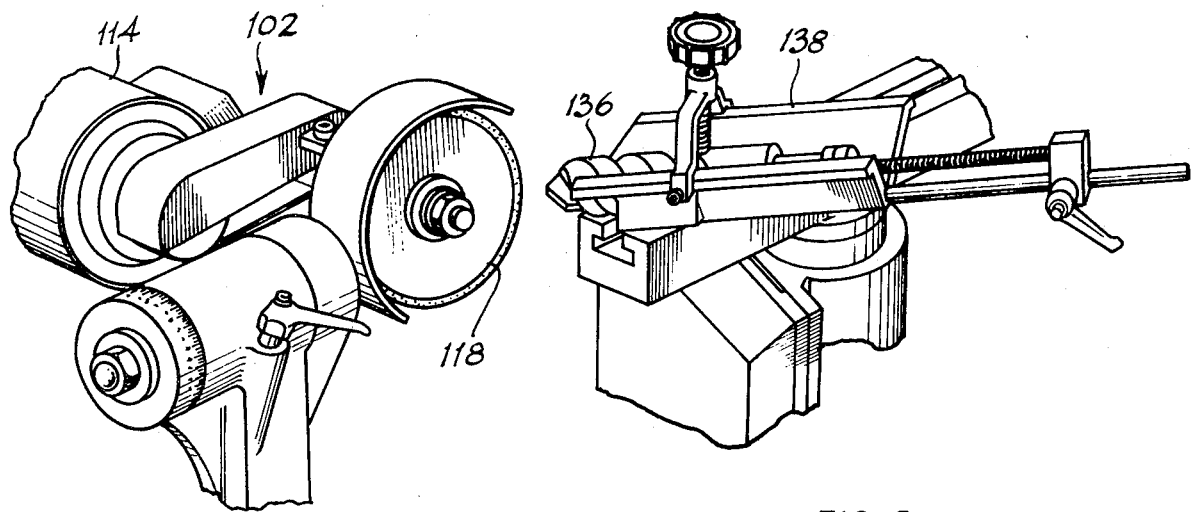
FIG. 5 is a perspective view of the grinding machine with a drill mounted thereon for sharpening.

FIG. 5 of the drawings, shows the grinding wheel assembly 102 positioned so as to be capable of sharpening a tipped twist drill 136 mounted in a V block fixture 138 secured to the work-piece table 28. For this purpose, the bracket 72 is turned to position the faces of the wheel 118 at an acute angle to the length of the table 28.

Figure 6:
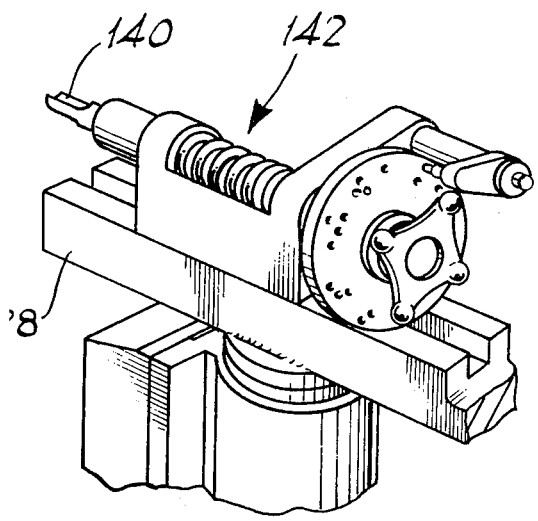
FIG. 6 is a perspective view of the grinding machine with a router cutter mounted thereon in a position for sharpening the end faces thereof.
Figure 7:
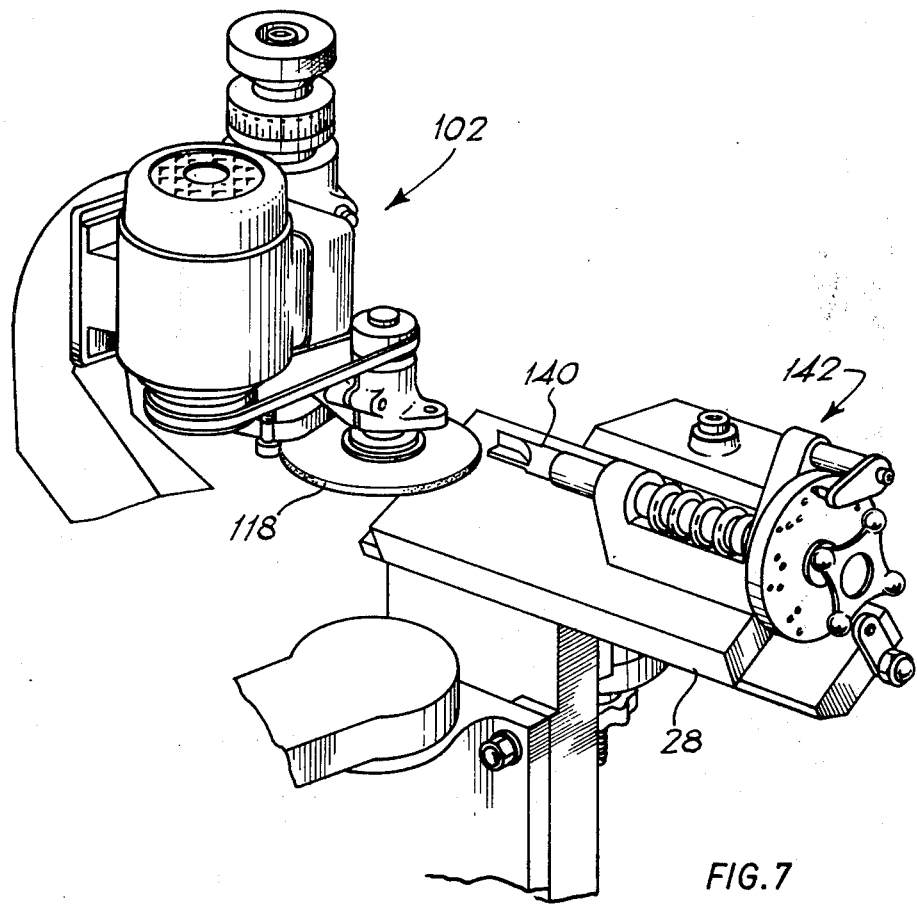
FIG. 7 is a perspective view of the grinding machine with the router cutter mounted thereon in a position for sharpening the side faces thereof.

FIGS. 6 and 7 of the drawings, show the grinding wheel assembly 102 positioned for sharpening the end face and the side faces of a router cutter 140 mounted in a fixture 142 secured to the work-piece table 28.

Figure 8:
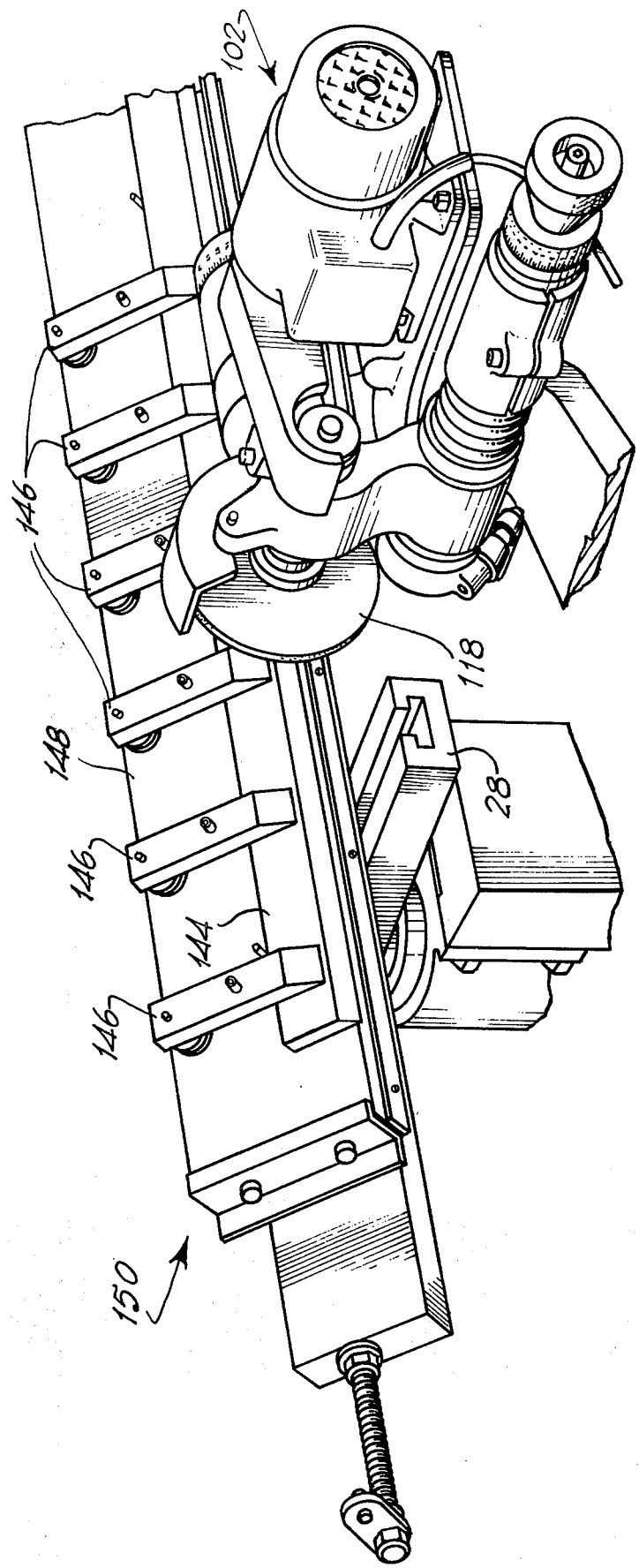
FIG. 8 is a perspective view of the grinding machine with a planar blade mounted thereon for sharpening.

FIG. 8 of the drawings, shows the grinding wheel assembly 102 positioned for sharpening a planar blade 144 which is secured by clamps 146 to a sliding carriage 148 on a fixture 150 mounted on the work-piece table 28. The carriage 148 is adapted to traverse past the grinding wheel 118 which is set at the correct angle for sharpening the cutting edge of the blade 144.

In a modification, the work-piece table 28 is provided with an extension piece which enables a large diameter circular saw blade having a radius greater than the overall length of the table to be mounted thereon. The extension piece comprises a cylindrical portion having a projection formed on its lower surface which is adapted to engage in the longitudinally extending slot 32 in the table 28 and be bolted in conventional manner to the end of the table remote from the indexing device 41. The upper end of the cylindrical portion of the extension piece has a horizontal arm secured thereto which extends beyond the end of the table 28 remote from the indexing device 41 and has a circular spigot formed on its upper surface at the end of the arm remote from the cylindrical portion. The circular spigot is adapted to engage in the central hole of the circular saw blade and locate the blade in position on the extension piece.

In addition, where a very small diameter circular saw blade is to be mounted on the work-piece table 28, the pad 46 is removed from the lower arm of the U-shaped member 44. The extension piece is mounted on the table 28 adjacent to the indexing device 41 and the horizontal arm thereof extends between the arms of the U-shaped member 44. The cylindrical portion of the extension piece is of such a length that when the saw blade is mounted on the circular spigot, the plane of the blade is at the same level that the upper surface of the pad 46 would be at when the pad 46 is mounted on the lower arm of the U-shaped member 44.

I claim:

1. A grinding machine comprising:
   a. a base,
   b. a work-piece support mounted on said base,
   c. a grinding wheel assembly having a grinding wheel rotatably mounted thereon,
   d. means mounting said grinding wheel assembly on said base, said mounting means including first means for pivotally adjusting the plane of rotation of the grinding wheel relative to said work-piece support about a first axis and a second axis and second means for pivotally adjusting the grinding wheel about a third axis for arcuate movement in a direction which is parallel to or included within a plane containing at least part of the cutting surface of the grinding wheel, and
   e. feed means for moving the grinding wheel along said third axis in a direction parallel to the rotational axis of said wheel.

2. A grinding machine according to claim 1 wherein said first means is adapted for pivotally adjusting the plane or rotation of the grinding wheel relative to said work-piece support about first and second axes which are substantially perpendicular to each other.

3. A grinding wheel according to claim 2 wherein said first means is adapted for pivotally adjusting the plane of rotation of the grinding wheel relative to said work-piece support about first and second axes which are substantially perpendicular to each other and are each substantially perpendicular to the rotational axis of the grinding wheel.

4. A grinding machine according to claim 1, wherein said feed means comprises a screw mechanism for moving the grinding wheel along the third axis and resilient means arranged to remove any backlash in the screw mechanism.

5. A grinding machine according to claim 1, wherein the grinding wheel is pivotally movable about the third axis between two fixed positions, said machine further comprising spring means biasing said grinding wheel towards one of said two fixed positions.

6. A grinding machine according to claim 1 further comprising means mounting the work-piece support on the base for pivotal movement about a fourth axis which is parallel to and spaced apart from the first axis.

7. A grinding machine according to claim 6, further comprising adjustment means for moving the work-piece support along the fourth axis.

8. A grinding machine according to claim 6, wherein the work-piece support includes an indexing mechanism which is adapted to engage with a tooth of a circular saw blade mounted on the support member for rotating the blade about its own axis to move successive teeth of the blade into a sharpening station adjacent to the cutting surface of said grinding wheel.

9. A grinding machine according to claim 8, wherein the indexing mechanism includes a saw blade support mechanism which is adapted to frictionally engage with and support the blade adjacent to the peripheral edge thereof.

10. A grinding machine according to claim 1, wherein the grinding wheel assembly includes a reversible electric motor drivably connected to the grinding wheel by a belt-and-pulley mechanism.

11. A grinding machine according to claim 1 further comprising a pillar upstanding from said base, the work-piece support and the grinding wheel assembly being mounted on opposite sides of said pillar.

* * * * *